US008838345B2

(12) United States Patent
Shimada

(10) Patent No.: US 8,838,345 B2
(45) Date of Patent: Sep. 16, 2014

(54) AUTOMATIC TRANSMISSION SYSTEM FOR BULLDOZER

(75) Inventor: Kenjiro Shimada, Komatsu (JP)

(73) Assignee: Komatsu Ltd., Tokyo (JP)

(*) Notice: Subject to any disclaimer, the term of this patent is extended or adjusted under 35 U.S.C. 154(b) by 320 days.

(21) Appl. No.: 13/144,714

(22) PCT Filed: Feb. 10, 2010

(86) PCT No.: PCT/JP2010/051912
§ 371 (c)(1),
(2), (4) Date: Jul. 15, 2011

(87) PCT Pub. No.: WO2010/101004
PCT Pub. Date: Sep. 10, 2010

(65) Prior Publication Data
US 2011/0276236 A1 Nov. 10, 2011

(30) Foreign Application Priority Data
Mar. 6, 2009 (JP) .................... 2009-053280

(51) Int. Cl.
G06F 7/70 (2006.01)
G06F 19/00 (2011.01)
G06G 7/00 (2006.01)
G06G 7/76 (2006.01)
E02F 9/20 (2006.01)
E02F 9/22 (2006.01)
F16H 61/16 (2006.01)

(52) U.S. Cl.
CPC ......... *E02F 9/2253* (2013.01); *F16H 2061/163* (2013.01); *F16H 61/16* (2013.01); *E02F 9/202* (2013.01)
USPC .................. 701/50; 701/51; 701/64; 477/115

(58) Field of Classification Search
CPC ....... G06F 7/00; G06F 19/3443; G06F 9/546; G06F 3/0481; B60W 20/10; B60W 30/08; B60W 10/10; B60W 20/20; B60W 20/00; F16H 61/02; F16H 3/44; F16H 3/62; F16H 3/006; F16H 3/08

USPC ........ 701/66, 48, 60, 51, 50, 55, 59; 477/108, 477/70, 156, 115, 149, 175, 5, 34, 3; 475/5; 192/3.57; 701/50, 51
See application file for complete search history.

(56) References Cited

U.S. PATENT DOCUMENTS 5,778,331 A * 7/1998 Leising et al. .................. 701/66
RE36,186 E * 4/1999 White et al. .................. 477/108
(Continued)

FOREIGN PATENT DOCUMENTS

JP 2-199356 A 8/1990
JP 2000-46178 A 2/2000
(Continued)

OTHER PUBLICATIONS

International Search Report of corresponding PCT Application No. PCT/JP2010/051912.

*Primary Examiner* — Calvin Cheung
*Assistant Examiner* — Luis A Martinez Borrero
(74) *Attorney, Agent, or Firm* — Global IP Counselors, LLP

(57) ABSTRACT

An automatic transmission system for a bulldozer includes an automatic speed stage shifting section that switches among speed stages depending on a vehicle speed, a speed stage maintaining section that maintains a currently selected speed stage until a predetermined speed stage shifting disobedient time elapses after completion of a speed stage shifting while disobeying a switching instruction from the automatic speed stage shifting section, a load detecting section that detects a vehicle load, and a control restricting section that restricts a control processing of the maintaining section for causing it to obey the shifting section's instruction when the vehicle load is a predetermined load or greater even before the disobedient time elapses.

7 Claims, 3 Drawing Sheets

(56) References Cited

U.S. PATENT DOCUMENTS

| | | |
|---|---|---|
| 7,572,203 B2 * | 8/2009 | Kashiwagi et al. ............ 477/34 |
| 2001/0056318 A1 * | 12/2001 | Tashiro et al. ................. 701/48 |
| 2004/0157702 A1 * | 8/2004 | Nakagawa et al. ............ 477/70 |
| 2006/0155450 A1 * | 7/2006 | Aubert ............................ 701/51 |
| 2006/0161324 A1 * | 7/2006 | Ozawa et al. .................. 701/50 |
| 2006/0281601 A1 * | 12/2006 | Iida ................................ 477/115 |
| 2006/0287158 A1 * | 12/2006 | Soliman et al. ............... 477/156 |
| 2008/0026910 A1 * | 1/2008 | Honma et al. ................. 477/149 |
| 2008/0312038 A1 * | 12/2008 | Nakagawa et al. ............ 477/175 |
| 2009/0029819 A1 * | 1/2009 | Tabata et al. .................. 475/5 |
| 2009/0055063 A1 * | 2/2009 | Nakamura et al. ............ 701/60 |
| 2009/0088290 A1 * | 4/2009 | Tabata et al. .................. 477/5 |
| 2009/0095102 A1 | 4/2009 | Koga et al. |
| 2009/0228180 A1 * | 9/2009 | Yamada .......................... 701/55 |
| 2009/0248265 A1 * | 10/2009 | Tabata et al. ................... 701/59 |
| 2009/0271081 A1 * | 10/2009 | Watanabe et al. ............. 701/60 |
| 2010/0004089 A1 * | 1/2010 | Iwase et al. ..................... 477/3 |
| 2010/0256877 A1 * | 10/2010 | Nakagawa et al. ............ 701/50 |
| 2011/0315499 A1 * | 12/2011 | Fukushiro et al. ............ 192/3.57 |

FOREIGN PATENT DOCUMENTS

| | | |
|---|---|---|
| JP | 3242421 B2 | 10/2001 |
| JP | 3250820 B2 | 11/2001 |
| JP | 2008-13870 A | 6/2008 |
| JP | 2008-309325 A | 12/2008 |

* cited by examiner

AUTOMATIC TRANSMISSION SYSTEM FOR BULLDOZER

CROSS-REFERENCE TO RELATED APPLICATIONS

This national phase application claims priority to Japanese Patent Application No. 2009-053280 filed on Mar. 6, 2009. The entire disclosure of Japanese Patent Application No. 2009-053280 is hereby incorporated herein by reference.

TECHNICAL FIELD

The present invention relates to an automatic transmission system and particularly to an automatic transmission system for a bulldozer that includes a transmission with a plurality of speed stages and is allowed to start moving at an arbitrary speed stage selected by an operator.

BACKGROUND ART

The bulldozers are generally provided with the automatic transmission systems. The automatic transmission systems are configured to switch the speed stage up and down in accordance with a vehicle speed and automatically shift down the speed stage especially when the vehicle speed is reduced to a predetermined speed or less due to a load applied to the bulldozers during travelling.

As described in Japanese Patent Nos. 3242421 and 3250820, some of the bulldozers with the aforementioned automatic speed stage shifting function are configured to automatically select the first speed stage when they start moving and subsequently execute a shifting control of shifting up the speed stage to the second speed stage and then to the third speed stage in accordance with increase in a vehicle speed.

By contrast, the so far produced bulldozers include another type of bulldozes configured to start moving at an arbitrary speed stage selected by an operator and subsequently shift up and down the speed stage in accordance with the vehicle speed.

A constant period of speed stage shifting disobedient time is set for the latter type of the bulldozers having the automatic speed stage shifting function. Immediately after starting moving, the bulldozers get accelerated from a vehicle speed of zero. Therefore, a predetermined period of time is set as the speed stage shifting disobedient time that an instruction from the automatic speed stage shifting function to shift down the speed stage is disobeyed in order to prevent the speed stage from being automatically shifted down in this low speed condition during the acceleration period.

SUMMARY

In such an automatic transmission system having a setting of the speed stage shifting disobedient time as described above, an acceleration characteristic of the vehicle varies in accordance with a speed stage to be selected, an acceleration performance of the engine, a soil property, a slanted state of the vehicle and the like. It is therefore required to set the speed stage shifting disobedient time to be relatively long. For example, the acceleration performance is not enough at a high speed stage or in switching the travel direction between forward and rearward directions. Therefore, the speed stage shifting disobedient time is herein required to be set to be longer compared to the other situations excluding these situations.

On the other hand, when a bulldozer executes a type of work such as excavation with holding earth and sand on a dozing plate immediately after starting moving at the forward second speed stage, it is preferable to shift down the second speed stage to the first speed stage as soon as possible for obtaining a large traction force. When the speed stage shifting disobedient time is set to be relatively long, however, the second speed stage is maintained even though it is preferable to shift down the second speed stage to the first speed stage. Accordingly, the bulldozer may stop moving due to an insufficient traction force.

It is an object of the present invention to set a speed stage shifting disobedient time to an automatic transmission system for a bulldozer allowed to start moving at an arbitrary speed stage selected by an operator and simultaneously to obtain a sufficient traction force when the bulldozer receives a large travel load at a lower vehicle speed immediately after starting moving or in switching the travel direction between forward and rearward directions.

An automatic transmission system for a bulldozer according to a first aspect of the present invention is an automatic transmission system for a bulldozer including a transmission having a plurality of speed stages. The automatic transmission system includes an automatic speed stage shifting section, a speed stage maintaining section, a load detecting section and a control restricting section. The automatic speed stage shifting section is configured to switch among the speed stages in accordance with a vehicle speed. The speed stage maintaining section is configured to maintains a currently selected speed stage until a predetermined speed stage shifting disobedient time elapses after completion of a speed stage shifting while disobeying a switching instruction from the automatic speed stage shifting section. The load detecting section is configured to detect a load applied to the bulldozer. The control restricting section is configured to restrict a control processing of the speed stage maintaining section for causing the speed stage maintaining section to obey the switching instruction from the automatic speed stage shifting section when the load applied to the bulldozer is greater than or equal to a predetermined load even before the speed stage shifting disobedient time elapses.

According to the automatic transmission system of the first aspect of the present invention, the speed stages are automatically switched back and forth in accordance with the vehicle speed. Further, the switching instruction from the automatic speed stage shifting section is disobeyed for maintaining the currently selected speed stage until the speed stage shifting disobedient time elapses after completion of the speed stage shifting. When the load applied to the vehicle is greater than or equal to a predetermined load, on the other hand, the control processing of the speed stage maintaining section is restricted and the speed stage shifting processing is executed in response to the switching instruction from the automatic speed stage shifting section even before the speed stage shifting disobedient time elapses.

Thus, the speed stage shifting instruction is herein disobeyed until the speed stage shifting disobedient time elapses. Therefore, an arbitrary speed stage is prevented from being automatically shifted down against an operator's intension at a low speed immediately after the bulldozer starts moving even if the bulldozer starts moving at a second or third speed stage. However, when the bulldozer executes a work immediately after starting moving, for instance, at a second or third speed stage and a large load is applied thereto, the speed stage shifting is executed based on the normal automatic speed stage shifting processing while the speed stage shifting instruction is obeyed, even before the speed stage shifting disobedient time elapses.

According to the automatic transmission system of the first aspect of the present invention, a smooth acceleration is achieved without shifting down the speed stage when acceleration is desired while a load is not applied to the bulldozer. On the other hand, the speed stage is quickly shifted down and a large traction force can be obtained when the bulldozer executes a work and a large load is applied thereto.

An automatic transmission system according to a second aspect of the present invention relates to the automatic transmission system according to the first aspect of the present invention. In the automatic transmission system, the control restricting section is configured to restrict the control processing of the speed stage maintaining section only either when the bulldozer starts moving or when a travel direction of the bulldozer is switched between a forward travel direction and a rearward travel direction.

In general, a negative effect is remarkable when the bulldozer starts moving or when the travel direction of the bulldozer is switched between the forward travel direction and the rearward travel direction.

In view of the above, according to the automatic transmission system of the second aspect of the present invention, the control processing of maintaining the speed stage is configured to be restricted only either when the bulldozer starts moving or when the travel direction of the bulldozer is switched between the forward travel direction and the rearward travel direction.

An automatic transmission system according to a third aspect of the present invention relates to the automatic transmission system according to the second aspect of the present invention. In the automatic transmission system, the load detecting section is configured to detect a vehicle deceleration speed and the vehicle speed.

According to the automatic transmission system of the third aspect of the present invention, the load applied to the vehicle is detected through the detection of the vehicle deceleration speed and the vehicle speed. Therefore, the load can be easily detected.

An automatic transmission system according to a fourth aspect of the present invention relates to the automatic transmission system according to the third aspect of the present invention. In the automatic transmission system, the control restricting section is configured to determine that the load applied to the bulldozer is greater than or equal to the predetermined load either when the vehicle deceleration speed is greater than a predetermined value or when the vehicle speed is less than a predetermined value.

According to the automatic transmission system of the fourth aspect of the present invention, it is determined that a load greater than a predetermined load is applied to the vehicle either when the vehicle deceleration speed is greater than a predetermined value or when the vehicle speed is less than a predetermined value. Accordingly, the control for maintaining the speed stage is restricted. Therefore, the normal automatic speed stage shifting processing is executed when the load applied to the bulldozer is greater than or equal to a predetermined load, and the speed stage is thus shifted down in principle.

An automatic transmission system according to a fifth aspect of the present invention relates to the automatic transmission system according to the fourth aspect of the present invention. The automatic transmission system further includes a speed stage detecting section configured to detect the currently selected speed stage. Further, the control restricting section is configured to restrict the control processing of the speed stage maintaining section only when the currently selected speed stage is a predetermined speed stage having a bad acceleration characteristic.

According to the automatic transmission system of the fifth aspect of the present invention, the control for maintaining the speed stage is restricted only at a speed stage having a bad acceleration characteristic. Therefore, unnecessary control restriction can be avoided and the bulldozer can travel with a smoother acceleration.

An automatic transmission system according to a sixth aspect of the present invention relates to the automatic transmission system according to the first aspect of the present invention. In the automatic transmission system, the automatic speed stage shifting section is configured to transmit an instruction of supplying a pressurized oil to one of hydraulic clutches provided to be uniquely matched with the respective speed stages. The speed stage maintaining section includes a speed stage shifting completion detecting section and a timer. The speed stage shifting completion detecting section is configured to detect completion of the speed stage shifting. The timer is configured to start counting the speed stage sifting disobedient time in response to completion of the speed stage shifting. Further, the speed stage shifting completion detecting section is configured to detect a timing when the pressurized oil is supplied to the aforementioned one of the hydraulic clutches and a pressure is generated in the aforementioned one of the hydraulic clutches as completion of the speed stage shifting.

When a transmission is provided with hydraulic clutches uniquely matched with respective speed stages, a speed stage shifting is not necessarily executed immediately in response to a speed stage shifting instruction. Specifically, when a speed stage shifting instruction is transmitted, a pressurized oil is supplied to a hydraulic clutch matched with the speed stage instructed by the speed stage shifting instruction. In the hydraulic clutch, the pressurized oil is herein supplied into a cylinder and a piston is moved towards a clutch plate. The cylinder is then abutted to the clutch plate. When the pressurized oil is further supplied thereto under the condition, pressure of the piston against the clutch plate is generated.

In view of the above, according to the automatic transmission system of the sixth aspect of the present invention, it is determined that the speed stage shifting is completed at the timing when a predetermined pressure is generated against the clutch plate, and the timer starts counting at this timing. Therefore, it is possible to execute accurate control if there is a large difference between the timing when the speed stage shifting instruction is transmitted and the timing when power transmission is actually started at a selected speed stage, especially when the travel direction of the bulldozer is switched between the forward travel direction and the rearward travel direction.

According to the present invention thus configured, a smooth acceleration can be achieved without shifting down the speed stage if a small load is applied to the bulldozer, especially when the bulldozer starts moving at an arbitrarily speed stage selected by an operator or when the travel direction of the bulldozer is switched between the forward travel direction and the rearward travel direction. Further, the speed stage is promptly shifted down and a sufficient traction force can be obtained when the bulldozer executes a work after completion of the speed stage shifting and a large load is accordingly applied to the bulldozer.

DESCRIPTION OF THE EMBODIMENTS

Overall Structure

Figure 1:
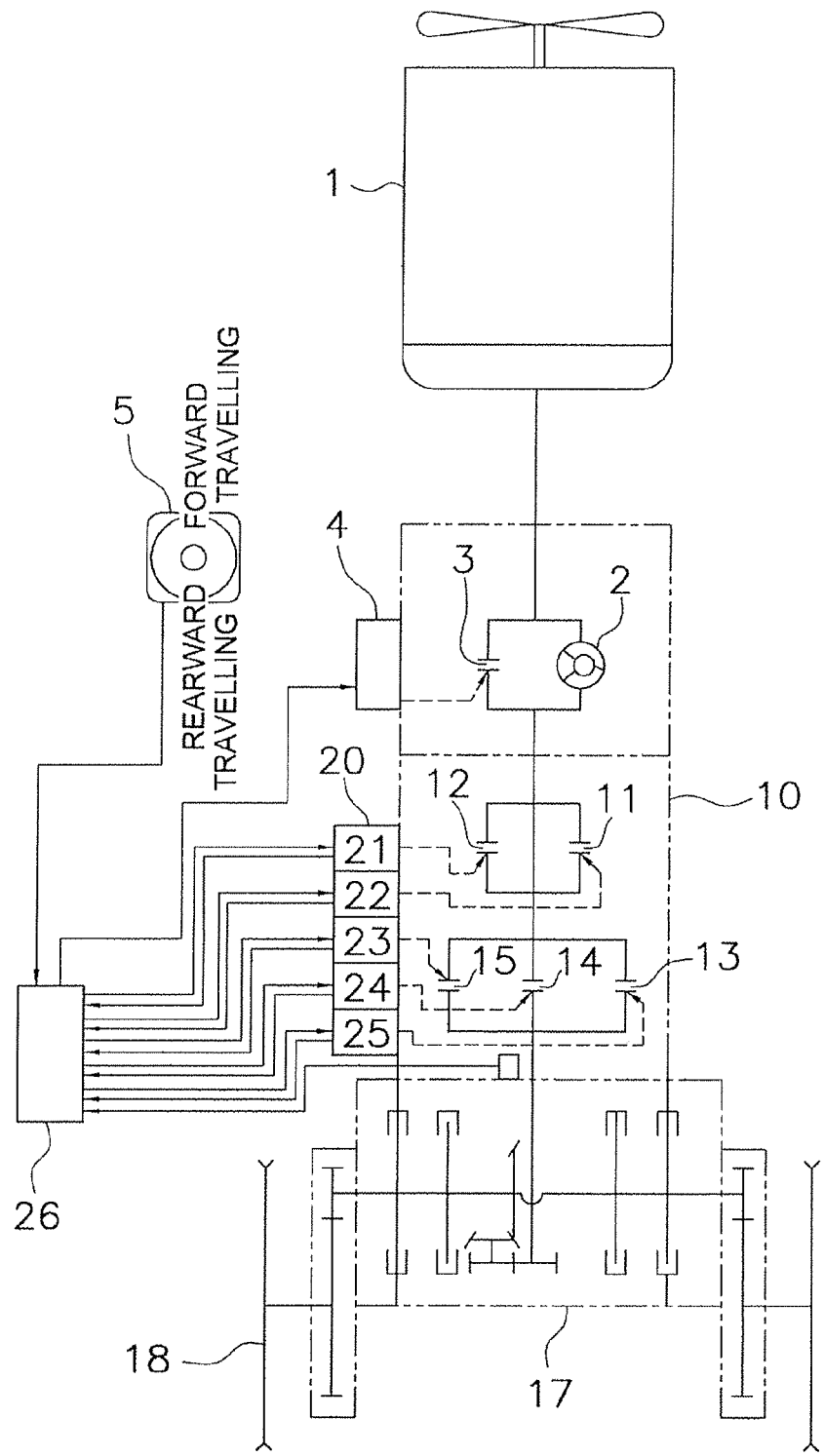
FIG. 1 is a schematic configuration diagram of a bulldozer provide with an automatic transmission system according to an exemplary embodiment of the present invention.

FIG. 1 illustrates a schematic configuration of a bulldozer provided with an automatic transmission system according to an exemplary embodiment of the present invention. It should be noted that FIG. 1 only represents components related to power transmission and power transmission control, while omitting representation of components such as a working unit and crawler belts. The bulldozer includes an engine 1, a power transmission unit, a control operating part and a gearbox (transmission) 10. The power transmission unit includes a torque converter 2 and a lock-up clutch 3. The control operating part includes a lock-up control valve 4 and a forward/rearward travel lever 5. The lock-up control valve 4 is a valve for controlling coupling (turning-on) and decoupling (turning-off) of the lock-up clutch 3.

The gearbox 10 includes a forward travel clutch 11, a rearward travel clutch 12, a first speed clutch 13, a second speed clutch 14 and a third speed clutch 15. Further, the bulldozer includes a vehicle speed detector 16, a transverse shaft related unit 17 and a sprocket 18. The vehicle speed detector 16 is configured to detect the rotation speed of the output shaft of the gearbox (i.e., the vehicle speed). It should be noted that each clutch is a multiple disc hydraulic clutch.

A speed stage shifting control valve 20 is configured to control seed stage shifting of the gearbox 10. The speed stage shifting control valve 20 includes a rearward travel clutch valve 21, a forward travel clutch valve 22, a third speed clutch valve 23, a second speed clutch valve 24 and a first speed clutch valve 25.

Control Unit

Further, the bulldozer includes a control unit 26. The control unit 26 includes a microcomputer formed by a RAM, a ROM, a CPU and the like. The lock-up control valve 4, the forward/rearward travel lever 5, the vehicle speed detector 16, the rearward travel clutch valve 21, the forward travel clutch valve 22, the third speed clutch valve 23, the second speed clutch valve 24 and the first speed clutch valve 25 are connected to the control unit 26.

Further, the control unit 26, the speed stage shifting control valve 20 and the vehicle speed detector 16 form an automatic speed stage shifting section, a speed stage maintaining section, a load detecting section and a control restricting section. The automatic speed stage shifting section has a function of switching among a plurality of speed stages in accordance with the vehicle speed. The speed stage maintaining section is set to have a predetermined speed stage shifting disobedient time Tsft. The speed stage maintaining section has a function of disobeying (overriding) a switching instruction from the automatic speed stage shifting section for maintaining a currently selected speed stage until the speed stage shifting disobedient time elapses immediately after the bulldozer starts moving or when the travel direction of the bulldozer is switched between the forward travel direction and the rearward travel direction. The load detecting section has a function of detecting a load based on the deceleration speed and the vehicle speed. The control restricting section has a function of restricting the control processing of the speed stage maintaining section for causing the speed stage maintaining section to obey the switching instruction from the automatic speed stage shifting section either when the deceleration speed is greater than a predetermined value or when the vehicle speed is less than a predetermined value even before the speed stage shifting disobedient time elapses after completion of the speed stage shifting. It should be noted that the deceleration speed is detected through a calculation by the control unit 26 based on a result detected by the vehicle speed detector 16.

Control Processing

Figure 2:
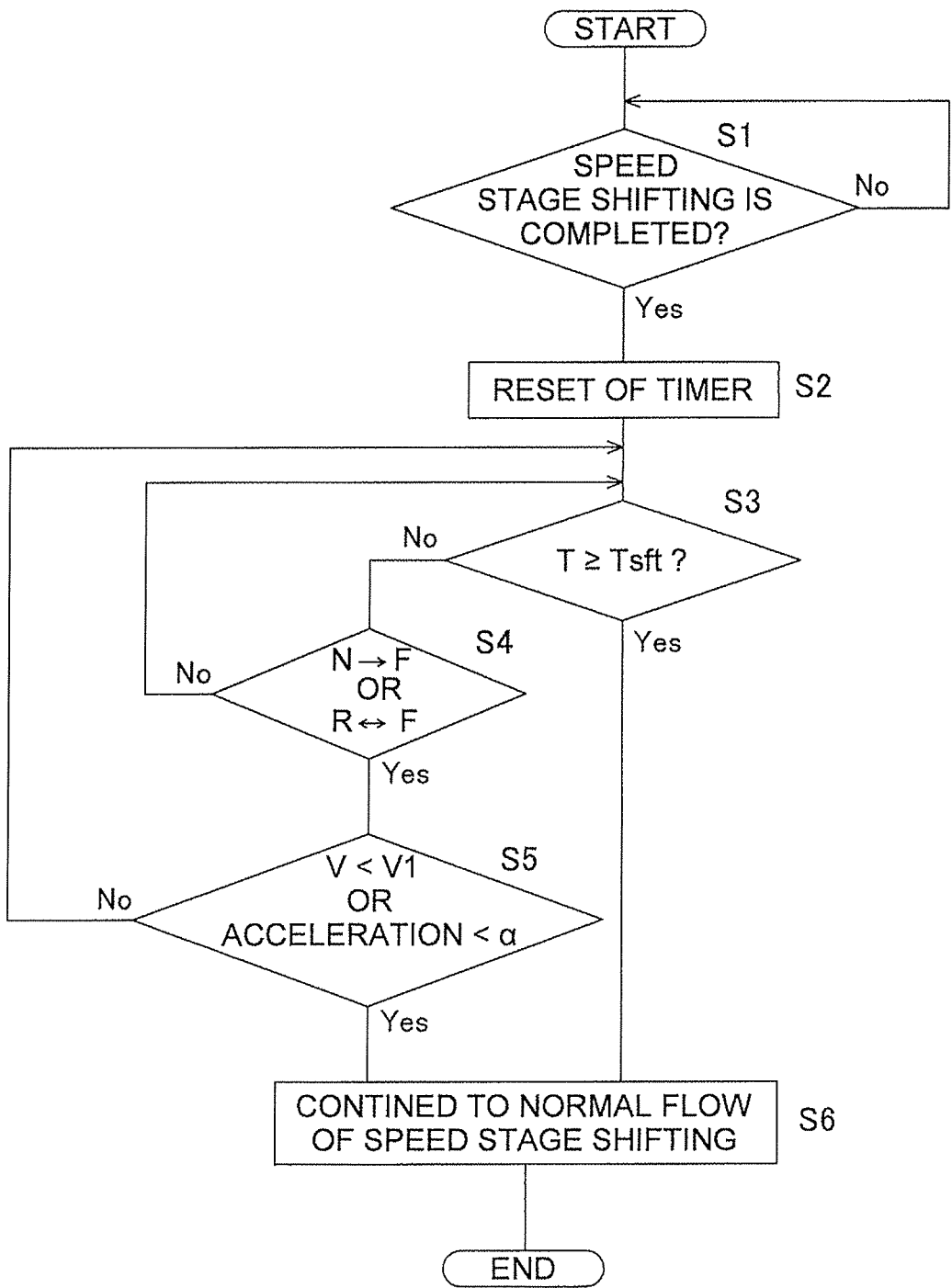
FIG. 2 is a control flowchart of the automatic transmission system.
Figure 3:
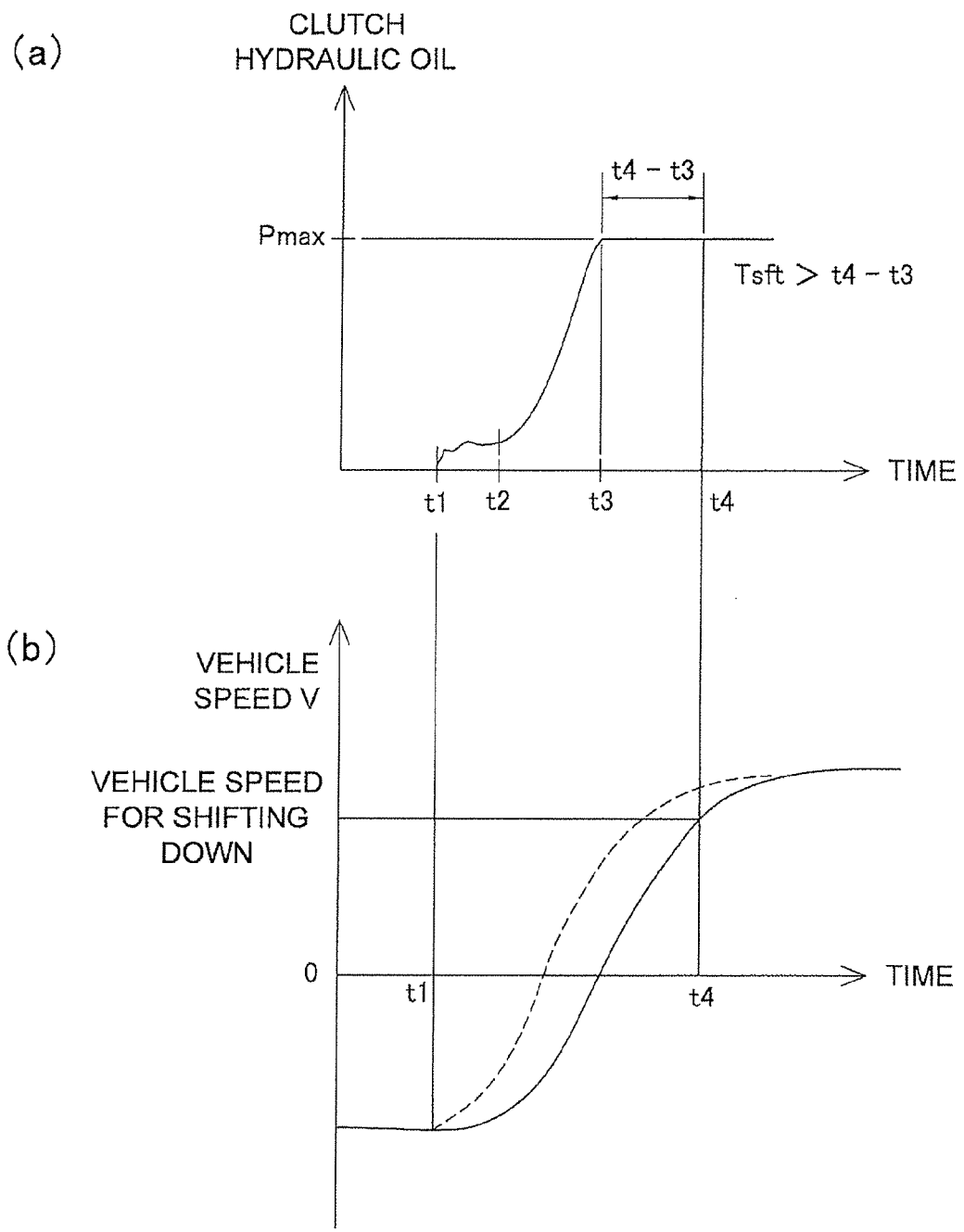
FIG. 3 includes: a chart (a) representing a relation between operation timing of switching between forward and rearward travel directions and vehicle speed; and a chart (b) representing a relation between time and vehicle speed.

Next, a control processing of the present control unit will be explained with reference to the flowchart represented in FIG. 2. First in Step S1, it is determined whether or not the transmission 10 completes speed stage shifting. The timing for determining "completion of the speed stage shifting" will be hereinafter explained in detail with reference to charts (a) and (b) of FIG. 3. The chart (a) of FIG. 3 represents variation in a hydraulic pressure to be supplied to the forward travel clutch 11, where the horizontal axis represents time and the vertical axis represents the hydraulic pressure to be supplied to the forward travel clutch 11. On the other hand, the chart (b) of FIG. 3 represents variation in a vehicle speed when the forward/rearward travel lever 5 is switched from the rearward travel position to the forward travel position, where the horizontal axis represents time and the vertical axis represents the vehicle speed.

As represented in the charts (a) and (b) of FIG. 3, the control unit 26 is configured to output an instruction of switching the travel direction from the rearward travel direction to the forward travel direction at a timing t1 in response to an operation of the forward/rearward travel lever 5. On the other hand, the vehicle speed is accelerated while being gradually changed from negative (rearward travel) to positive (forward travel). The chart (a) of FIG. 3 represents the situation at this point in terms of the hydraulic pressure to be supplied to the forward travel clutch 11. Specifically, a low hydraulic pressure is continued in a time period from t1 to t2 when the pressurized oil is supplied to the forward travel clutch 11 through the forward travel clutch valve 22 in response to the instruction from the control unit 26. The time period t1 to t2 is a period of time required for a piston of the forward travel clutch 11 to be moved and abutted to a clutch plate. In the time period from t2 to t3, the hydraulic pressure is gradually increased by the characteristic of the forward travel clutch valve 22. In the time period from t2 to t3, the pressure of the clutch plate is insufficient. Therefore, the clutch may be slipped in some cases. At the time t3, a predetermined clutch pressure is achieved, and the hydraulic pressure is controlled to be a pressure Pmax by the forward travel clutch valve 22. The time t3 is thus considered as the timing of "completion of the speed stage shifting".

The processing proceeds from Step S1 to Step S2 when it is determined that the speed stage shifting is completed. In Step S2, the timer for counting the speed stage shifting disobedient time Tsft is reset. In other words, the timer starts counting the speed stage shifting disobedient time Tsft. The speed stage shifting disobedient time Tsft is herein set to be a time period enough to complete a series of actions of: switching the position of the forward/rearward travel lever; actual completion of the travel directional switching of the bulldozer; and acceleration of the vehicle speed to a predetermined speed. The term "predetermined vehicle speed" herein refers to a vehicle speed at which the speed stage is shifted down by means of the automatic speed stage shifting. It should be noted that the chart (b) of FIG. 3 represents an acceleration characteristic of the vehicle to be varied in accordance with conditions. Specifically, the worst acceleration characteristic is depicted with a solid line, whereas the best acceleration characteristic is depicted with a broken line. As represented in the charts (a) and (b) of FIG. 3, the speed stage shifting disobedient time Tsft is specifically set to be at least longer than a time period of t4–t3, because there is a time lag (i.e., t4–t3) until a predetermined vehicle speed is achieved after the clutch is engaged.

Next in Step S3, it is determined whether or not a counted time T of the timer reaches the speed stage shifting disobedient time Tsft. The processing proceeds from Step S3 to Step S4 when the speed stage shifting disobedient time Tsft does not elapse, i.e., when the counted value T of the timer does not reach the speed stage shifting disobedient time Tsft. In Step S4, it is determined which of the following directions the forward/rearward travel lever 5 is switched in, either a direction from the neutral position to the forward travel position (i.e., N to F) or a direction from the rearward (or reward) travel position to the forward (or rearward) position (i.e., R to F (or F to R)). In other words, it is determined which of the following is selected by the bulldozer, either starting moving or switching between the forward travel direction and the rearward travel direction. Further in Step S5, it is determined whether the vehicle speed V is less than a predetermined minimum vehicle speed V1 and whether the deceleration speed is greater than or equal to a predetermined deceleration speed α. It should be noted that the deceleration speed α is set under the assumption that the bulldozer start executing a work immediately after starting moving and the vehicle speed is thereby rapidly reduced. The deceleration speed α is obtained by experiments and is preliminarily set. When a work load is extremely high, the vehicle speed is rapidly reduced and the vehicle may stop moving. In such a case, the deceleration speed cannot be detected. Therefore, the determination based on the minimum vehicle speed V1 is herein executed other than the determination based on the deceleration speed as an alternative of the determination based on the deceleration speed. It should be noted that the minimum vehicle speed V1 is set to be less than a threshold speed at which the second speed stage is shifted down to the first speed stage in the automatic speed stage shifting processing.

When the determination steps S4 and S5 results in "YES", the normal speed stage shifting processing is executed in Step S6. Specifically, even before the speed stage shifting disobedient time Tsft elapses, the control for maintaining the speed stage is cancelled within the speed stage shifting disobedient time Tsft and the automatic speed stage shifting is executed in response to the instruction of the normal automatic speed stage shifting processing. Specifically, when the determination Step S5 results in "YES", the speed stage is shifted down by the processing of Step S6 because the vehicle speed is supposed to be lower than or equal to a speed at which a currently selected speed stage should be shifted down. A sufficient traction force can be obtained by shifting down the speed stage.

When the speed stage shifting disobedient time Tsft elapses after completion of the speed stage shifting, on the other hand, the processing proceeds from Step S3 to Step S6 and the normal speed stage shifting processing is executed. The normal speed stage shifting processing in Step S6 is completely the same as the well-known speed stage shifting processing. In the normal speed stage shifting processing in Step S6, the speed stage of the transmission is switched in accordance with the vehicle speed.

(a) Immediately after the bulldozer starts moving or when the travel direction of the bulldozer is switched between the forward travel direction and the rearward travel direction, a currently selected speed stage is maintained while a switching instruction from the automatic speed stage shifting section is disobeyed until the speed stage shifting disobedient time Tsft elapses. Accordingly, the speed stage is prevented from being automatically shifted down against an operator's intention at a low speed immediately after the bulldozer starts moving even if the bulldozer starts moving at the second or third speed stage. Therefore, a smooth acceleration can be achieved. On the other hand, the normal speed stage shifting processing is executed and the speed stage is accordingly shifted down when a large load is applied to the bulldozer even under the control within the speed stage shifting disobedient time. Therefore, a sufficient traction force can be obtained even before the speed stage shifting disobedient time elapses. Accordingly, the bulldozer can smoothly execute a work.

(b) The load applied to the vehicle is detected through the detection of the vehicle deceleration speed and the vehicle speed. Therefore, the components for detecting a load can be easily prepared.

(c) The timing, when the pressurized oil is supplied to a hydraulic clutch and a pressure is generated therein in shifting a speed stage, is detected as completion of the speed stage shifting. Therefore, an accurate control can be executed.

Other Exemplary Embodiments

In the aforementioned exemplary embodiment, a particular speed stage is not set for restricting the control for maintaining the speed stage. However, the control may be configured to be restricted only at a speed stage having an especially bad acceleration characteristic (e.g., the forward third speed stage).

In the aforementioned exemplary embodiment, the automatic transmission system with the lock-up clutch has been exemplified. However, the present invention can be applied to the automatic transmission systems without a lock-up clutch.

Further, the components for detecting a load are not limited to those in the aforementioned exemplary embodiment.

In an automatic transmission system for a bulldozer, the speed stage is not shifted down and a smooth acceleration can be achieved if a vehicle load is small especially when the bulldozer starts moving at an arbitrary speed stage selected by an operator or when the travel direction of the bulldozer is switched between the forward travel direction and the rearward travel direction. Further, the speed stage is quickly shifted down and a sufficient traction force can be obtained when the bulldozer executes a work after completion of the speed stage shifting and a large load is accordingly applied to the bulldozer.

The invention claimed is:

1. An automatic transmission system for a bulldozer including a transmission having a plurality of speed stages, the speed stages including at least a first speed stage that is a lowest speed stage among the speed stages, the automatic transmission system comprising:
   an automatic speed stage shifting section configured to switch among the speed stages in accordance with a vehicle speed;
   a speed stage maintaining section configured to execute a control processing to maintain a currently selected speed stage until a predetermined speed stage shifting disobedient time elapses after completion of a speed stage shifting, the control processing being configured to cause a switching instruction from the automatic speed stage shifting section to be disobeyed;

a load detecting section configured to detect a load applied to the bulldozer; and a control restricting section configured to restrict the control processing of the speed stage maintaining section upon the load detected by the load detecting section being greater than or equal to a predetermined load such that the switching instruction is obeyed even before the speed stage shifting disobedient time elapses, the control restricting section being configured to restrict the control processing of the speed stage maintaining section only either when the bulldozer starts moving while a speed stage other than the first speed stage is selected, or when a travel direction of the bulldozer is switched between a forward travel direction and a rearward travel direction while a speed stage other than the first speed stage is selected.

2. The automatic transmission system for a bulldozer recited in claim 1, wherein
the load detecting section is configured to detect a vehicle deceleration speed and the vehicle speed.

3. The automatic transmission system for a bulldozer recited in claim 2, wherein
the control restricting section is configured to determine that the load applied to the bulldozer is greater than or equal to the predetermined load either when the vehicle deceleration speed is greater than a predetermined value or when the vehicle speed is less than a predetermined value.

4. The automatic transmission system for a bulldozer recited in claim 3, further comprising:
a speed stage detecting section configured to detect the currently selected speed stage, and
wherein the control restricting section is configured to restrict the control processing of the speed stage maintaining section only when the currently selected speed stage is a predetermined speed stage having a bad acceleration characteristic.

5. The automatic transmission system for a bulldozer recited in claim 1, wherein
the automatic speed stage shifting section is configured to transmit an instruction of supplying a pressurized oil to one of hydraulic clutches provided to be uniquely matched with the respective speed stages,
the speed stage maintaining section includes
a speed stage shifting completion detecting section configured to detect completion of the speed stage shifting, and
a timer configured to start counting the speed stage sifting disobedient time in response to completion of the speed stage shifting,
the speed stage shifting completion detecting section being configured to detect a timing when the pressurized oil is supplied to the one of the hydraulic clutches and a pressure is generated in the one of the hydraulic clutches as completion of the speed stage shifting.

6. An automatic transmission system for a bulldozer including a transmission having a plurality of speed stages, the speed stages including at least a first speed stage that is a lowest speed stage among the speed stages, the automatic transmission system comprising:
a plurality of clutches configured and arranged to selectively engage the speed stages of the transmission;
a plurality of clutch actuators configured and arranged to selectively connect and disconnect the clutches;
a control unit that includes
an automatic speed stage shifting section configured to switch among the speed stages in accordance with a vehicle speed by issuing a switching instruction to the clutch actuators;
a speed stage maintaining section configured to execute a control processing to cause the switching instruction from the automatic speed stage shifting section to be disobeyed such that a currently selected speed stage is maintained until a predetermined speed stage shifting disobedient time elapses, the control processing causing the switching instruction to be disobeyed being executed upon the switching instruction being issued either immediately after the bulldozer starts moving or when a travel direction of the bulldozer is switched between a forward travel direction and a rearward travel direction;
a load detecting section configured to detect a load applied to the bulldozer; and
a control restricting section configured to restrict the control processing of the speed stage maintaining section upon the load detected by the load detecting section becoming greater than or equal to a predetermined load, the restriction causing the switching instruction to be obeyed even if the speed stage shifting disobedient time has not yet elapsed.

7. The automatic transmission system for a bulldozer recited in claim 6, wherein
the control restricting section is configured to restrict the control processing of the speed stage maintaining section only when the control processing of the speed stage maintaining section is executed while a speed stage other than the first speed stage is selected.

* * * * *